(12) United States Patent
Rossello

(10) Patent No.: US 7,856,098 B1
(45) Date of Patent: Dec. 21, 2010

(54) ECHO CANCELLATION AND CONTROL IN DISCRETE COSINE TRANSFORM DOMAIN

(75) Inventor: Norbert Rossello, Biot (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 1334 days.

(21) Appl. No.: 11/228,785

(22) Filed: Sep. 15, 2005

(51) Int. Cl.
  *H04M 9/08* (2006.01)
(52) U.S. Cl. .............................. 379/406.12; 379/406.08
(58) Field of Classification Search ........................ 370/406.01–406.16; 455/570; 381/66, 71.1–71.14; 379/406.01–406.16
  See application file for complete search history.

(56) References Cited

U.S. PATENT DOCUMENTS

| | | | |
|---|---|---|---|
| 6,154,762 A * | 11/2000 | Malvar | 708/400 |
| 6,249,581 B1 * | 6/2001 | Kok | 379/406.16 |
| 6,738,480 B1 * | 5/2004 | Berthault et al. | 381/66 |
| 6,766,019 B1 * | 7/2004 | Benesty et al. | 379/406.01 |
| 2004/0252652 A1 * | 12/2004 | Berestesky et al. | 370/286 |

* cited by examiner

*Primary Examiner*—Fan Tsang
*Assistant Examiner*—Akelaw A Teshale
(74) *Attorney, Agent, or Firm*—Farjami & Farjami LLP

(57) ABSTRACT

There is provided an echo cancellation method that comprises computing a Discrete Cosine Transform (DCT) domain over a plurality of samples of a first signal to generate a plurality of first DCT samples, selecting one or more first coefficients from the plurality of first DCT samples, computing a DCT domain over a plurality of samples of a second signal to generate a plurality of second DCT samples, selecting one or more second coefficients from the plurality of second DCT samples, wherein the one or more second coefficients are same coefficients as the one or more first coefficients, applying normalized cross correlation to the one or more first coefficients and the one or more second coefficients to generate normalized cross correlation values, cancelling an echo of the second signal from the first signal by determining a bulk delay and a double talk condition based on the normalized cross correlation values.

22 Claims, 4 Drawing Sheets

ECHO CANCELLATION AND CONTROL IN DISCRETE COSINE TRANSFORM DOMAIN

BACKGROUND OF THE INVENTION

1. Field of the Invention

The present invention relates generally to echo cancellation and control in communication networks. More particularly, the present invention relates to methods and systems for delay estimation, double talk detection and echo path change detection for echo cancellation and control.

2. Background Art

Subscribers use speech quality as the benchmark for assessing the overall quality of a telephone network. A key technology to provide a high quality speech is echo cancellation and control. Echo canceller performance in a telephone network, either a TDM or packet telephony network, has a substantial impact on the overall voice quality. An effective removal of hybrid and acoustic echo inherent in telephone networks is a key to maintaining and improving perceived voice quality during a call.

Echoes occur in telephone networks due to impedance mismatches of network elements and acoustical coupling within telephone handsets. Hybrid echo is the primary source of echo generated from the public-switched telephone network (PSTN). As shown in FIG. 1, hybrid echo 110 is created by a hybrid, which converts a four-wire physical interface into a two-wire physical interface. The hybrid reflects electrical energy back to the speaker from the four-wire physical interface. Acoustic echo, on the other hand, is generated by analog and digital telephones, with the degree of echo related to the type and quality of such telephones. As shown in FIG. 1, acoustic echo 120 is created by a voice coupling between the earpiece and microphone in the telephones, where sound from the speaker is picked by the microphone, for example, by bouncing off the walls, windows, and the like. The result of this reflection is the creation of multi-path echo, which would be heard by the speaker unless eliminated.

As shown in FIG. 1, in modern telephone networks, echo canceller 140 is typically positioned between hybrid 130 and network 150. Generally speaking, echo cancellation process involves two steps. First, as the call is set up, echo canceller 140 employs a digital adaptive filter to adapt to the far-end signal and create a model based on the far-end signal before passing through hybrid 130. After the near-end signal including the echo signal, passes through hybrid 130, echo canceller 140 subtracts the far-end model from the near-end signal to cancel hybrid echo and generate an error signal. Although this echo cancellation process removes a substantial amount of the echo, non-linear components of the echo may still remain. To cancel non-linear components of the echo, the second step of the echo cancellation process utilizes a non-linear processor (NLP) to eliminate the remaining or residual echo by attenuating the signal below the noise floor.

SPARSE echo cancellers employ adaptive filter algorithms with a dynamically positioned window to cover a desired echo tail length, such as a sliding window, e.g. a 24 ms window, covering an echo path delay, e.g. a 128 ms delay. To properly cancel the echo, the echo canceller must determine a pure delay or a bulk delay, which is indicative of the location of the echo signal segment or window within the 128 ms echo path delay. If the bulk delay is not determined accurately, not only the echo signal is not properly cancelled, but also the echo canceller further distorts the signal by performing the echo cancellation at a wrong place. Therefore, it is crucial that the bulk delay is determined accurately.

Because the echo canceller is utilized to cancel an echo of Rin signal 141 from Sin signal 132, presence of speech signal from the near end would cause the adaptive filter to converge on a combination of near end speech signal and Rin signal 141, which will lead to an inaccurate echo path model, i.e. incorrect adaptive filter coefficients. Therefore, in order to cancel the echo signal, the adaptive filter should not train in the presence of the near end speech signal. To this end, conventional echo cancellers analyze Sin signal 132 and determine whether it contains the speech of a near end talker. By convention, if two people are talking over a communication network or system, one person is referred to as the "near talker," while the other person is referred to as the "far talker." The combination of speech signals from the near end talker and the far end talker is referred to as "double talk." To determine whether Sin signal 132 contains double talk, a double talk detector estimates and compares the characteristics of Rin signal 141 and Sin signal 132. A primary purpose of the double talk detector is to prevent the adaptive filter from adapting when double talk is detected.

If the double talk detector does not accurately determine the existence of a double talk condition, the adaptive filter improperly trains on a signal that includes a near end signal, and the adaptive will not accurately model the echo signal. Conversely, if the double talk detector does not accurately determine non-existence of a double talk condition, the adaptive filter does not train on Rin signal 141 and the adaptive will not accurately model the echo signal.

Conventional methods for determining the bulk delay and detecting the double talk condition suffer from many disadvantages. For example, the Geigel algorithm, which is performed in time domain, computes the correlation between Rin signal 141 and Sin signal 132. The Geigel algorithm estimates the bulk delay when the correlation between Rin signal 141 and Sin signal 132 is high and determines that a double talk condition exists when the correlation between Rin signal 141 and Sin signal 132 is low. The Geigel algorithm, however, suffers from poor performance in noisy conditions, because it is merely based on energy detection. Further, the Geigel algorithm does not properly detect double talk in the event of embedded near end signal with small amplitude, and also falsely detects double talk when none exists.

Other conventional methods for determining the bulk delay and detecting the double talk condition use a spectral approach to perform full or sub bandwidth matching based on FFT (Fast Fourier Transform). These conventional approaches also suffer from several drawbacks, such as being impacted by the echo path and poor performance against noise.

Accordingly, there is a need in the art for more accurate determination of the bulk delay and detection of the double talk condition in echo cancellation and control systems.

SUMMARY OF THE INVENTION

The present invention is directed to methods and systems for echo cancellation and control in the Discrete Cosine Transform (DCT) domain. In one aspect, an echo cancellation method comprises obtaining a plurality of samples from a first signal, computing a Discrete Cosine Transform (DCT) domain over the plurality of samples of the first signal to generate a plurality of DCT samples of the first signal, selecting one or more first coefficients from the plurality of DCT samples of the first signal, obtaining a plurality of samples from a second signal, computing a DCT domain over the plurality of samples of the second signal to generate a plurality of DCT samples of the second signal, selecting one or more second coefficients from the plurality of DCT samples of the second signal, wherein the one or more second coefficients are same coefficients as the one or more first coefficients, applying normalized cross correlation to the one or more first coefficients and the one or more second coefficients to generate normalized cross correlation values, and cancelling an echo of the second signal from the first signal using the normalized cross correlation values.

In a further aspect, the method further comprises determining a bulk delay of the echo based on the normalized cross correlation values, where the bulk delay is determined at a maximum value of the normalized cross correlation values.

In another aspect, the method further comprises determining a double talk condition based on the normalized cross correlation values, where the double talk condition is determined at a minimum value of the normalized cross correlation values.

In additional aspects, the method further comprises classifying the first signal and the second signal prior to obtaining the plurality of samples, and computing a weighting window prior to computing the DCT domain over the plurality of samples of the first signal and the plurality of samples of the second signal.

In yet another aspect, one or more first coefficients are selected based on predetermined criteria including highest energy, major peaks and/or more fluctuations. Also, in another aspect, the method further comprises determining an echo path change based on the normalized cross correlation values.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
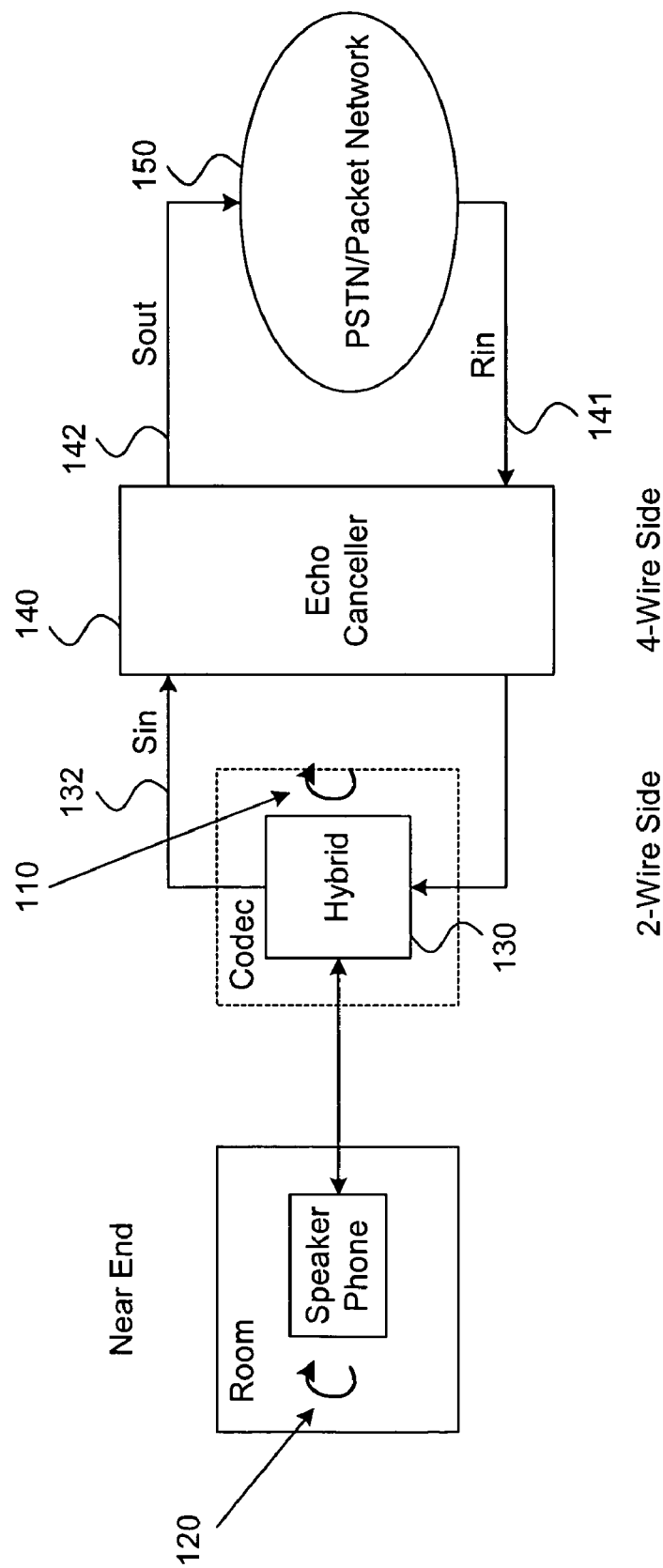
FIG. 1 illustrates a block diagram of a conventional communication system showing a placement of an echo canceller in an access network.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
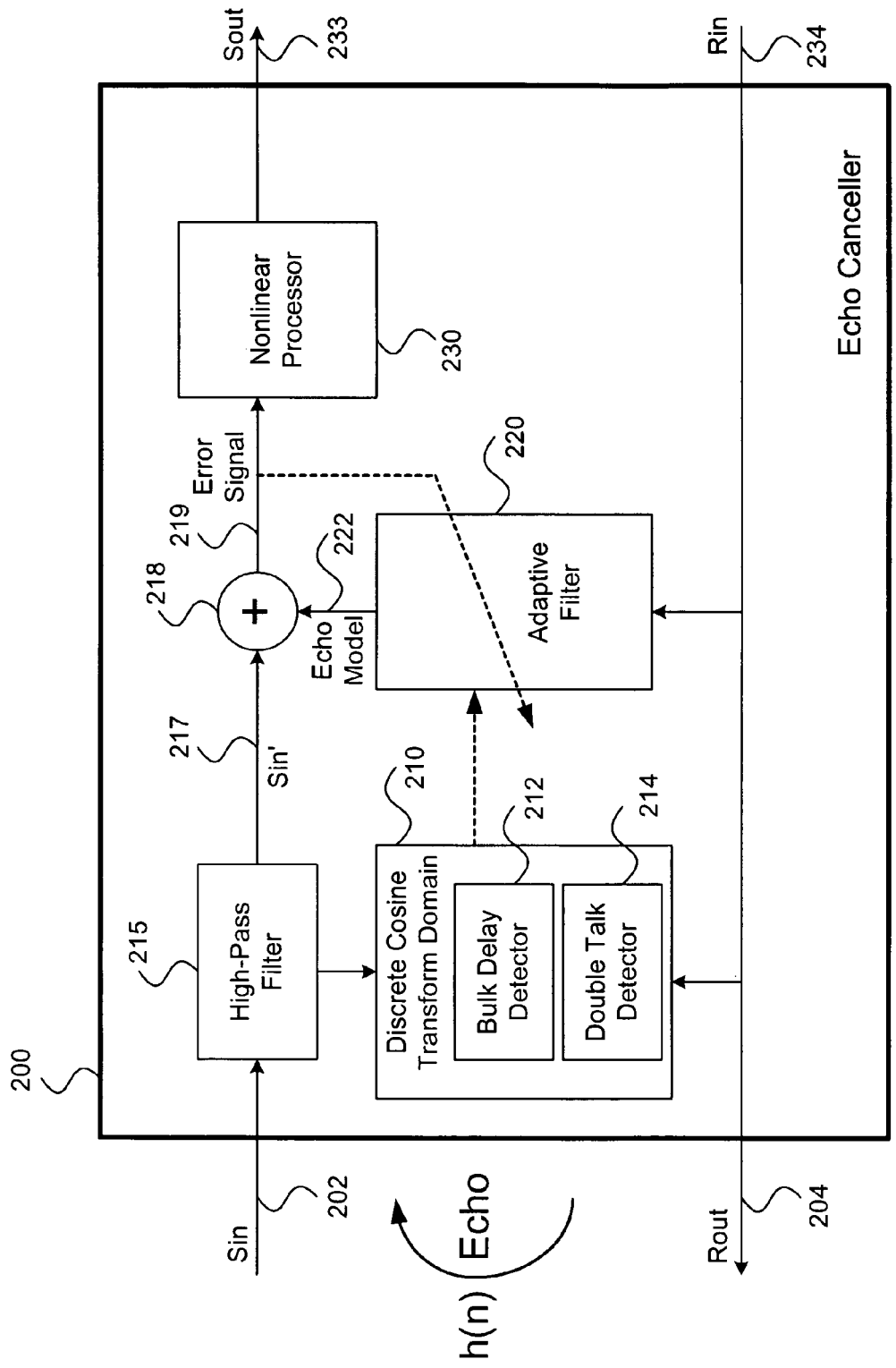
FIG. 2 illustrates a block diagram of an echo canceller, according to one embodiment of the present invention.

FIG. 2 illustrates a block diagram of echo canceller 200, according to one embodiment of the present invention. As shown, echo canceller 200 includes bulk delay detector 212 and double talk detector 214 in discrete cosine transform domain module 210, high-pass filter 215, adaptive filter 220 and nonlinear processor 230. During its operation, echo canceller 200 receives Rin signal 234 from the far end, which is fed to adaptive filter 220, and bulk delay detector 212 and double talk detector 214 in discrete cosine transform domain module 210, and is passed through to the hybrid, e.g. see hybrid 130 of FIG. 1, as Rout signal 204 to the near end. As discussed above, the hybrid causes Rout signal 204 to be reflected as Sin signal 202 from the near end, which is fed to echo canceller 200.

High-pass filter 215, which is placed at the near-end side of echo canceller 200, removes DC component from Sin signal 202 and generates Sin' signal 217. Double talk detector 214 controls the behavior of adaptive filter 220 during periods when Sin signal 202 from the near end reaches a certain level. Because echo canceller 200 is utilized to cancel an echo of Rin signal 234 from the far end, presence of speech signal from the near end would cause adaptive filter 220 to converge on a combination of near end speech signal and Rin signal 234, which will lead to an inaccurate echo path model, i.e. incorrect adaptive filter 220 coefficients. Therefore, in order to cancel the echo signal, adaptive filter 220 should not train in the presence of the near end speech signal. To this end, double talk detector 214 analyzes the incoming signal and determine whether it is solely an echo signal of Rin signal 234 or also contains the speech of a near end talker to prevent adaptive filter 220 from adaptation when double talk is detected or to adjust the degree of adaptation based on confidence level of double talk detection.

Echo canceller 200 utilizes adaptive filter 220 to model the echo path and its delay. In one embodiment, adaptive filter 220 uses a transversal filter with adjustable taps, where each tap receives a coefficient that specifies the magnitude of the corresponding output signal sample and each tap is spaced a sample time apart. The better the echo canceller can estimate what the echo signal will look like, the better it can eliminate the echo. To improve performance of echo canceller 200, it may be desirable to vary the adaptation rate at which the transversal filter tap coefficients of adaptive filter 220 are adjusted. For instance, if double talk detector 214 denotes a high confidence level that the incoming signal is an echo signal, it is preferable for adaptive filter 220 to adapt quickly. On the other hand, if double talk detector 214 denotes a low confidence level that the incoming signal is an echo signal, i.e. it may include double talk, it is preferable to decline to adapt at all or to adapt very slowly. If there is an error in determining whether Sin signal 202 is an echo signal, a fast adaptation of adaptive filter 220 causes rapid divergence and a failure to eliminate the echo signal.

Adaptive filter 220 may be represented by function h(n), which is originally reset, i.e. h(n)=0. As Rin signal 234 is received by adaptive filter 220, function h(n) grows to form an echo path model based on Rin signal 234 from the far end. In one embodiment, echo canceller 200 can be a SPARSE echo canceller, which employs adaptive filter algorithms with a dynamically positioned window to cover a desired echo tail length. In such embodiment, bulk delay detector 212 uses a sliding window, e.g. a 24 ms window, covering an echo path delay, e.g. a 128 ms delay. To properly cancel the echo, bulk delay detector 212 must determine pure delay or bulk delay, which is indicative of the location of the echo signal segment or window within the 128 ms echo path delay.

As shown in FIG. 2, adaptive filter 220 produces echo model signal 222 based on Rin signal 234 from the far end. Error estimator 218 receives Sin' signal 217, which is the output of high-pass filter 215, and subtracts echo model signal 222 from Sin' signal 217 to generate residual echo signal or error signal 219. Adaptive filter 220 also receives error signal 219 and updates its coefficients based on error signal 219.

It is known that the echo path includes nonlinear components that cannot be removed by adaptive filter 220 and, thus, after subtraction of echo model signal 222 from Sin' signal 217, there remains residual echo, which must be eliminated by nonlinear processor (NLP) 230. As shown NLP 230 receives residual echo signal or error signal 219 from error estimator 218 and generates Sout 233 for transmission to far end. If error signal 219 is below a certain level, NLP 230 replaces the residual echo with either comfort noise if the comfort noise option is enabled, or with silence if the comfort noise option is disabled.

Figures 1, 3:
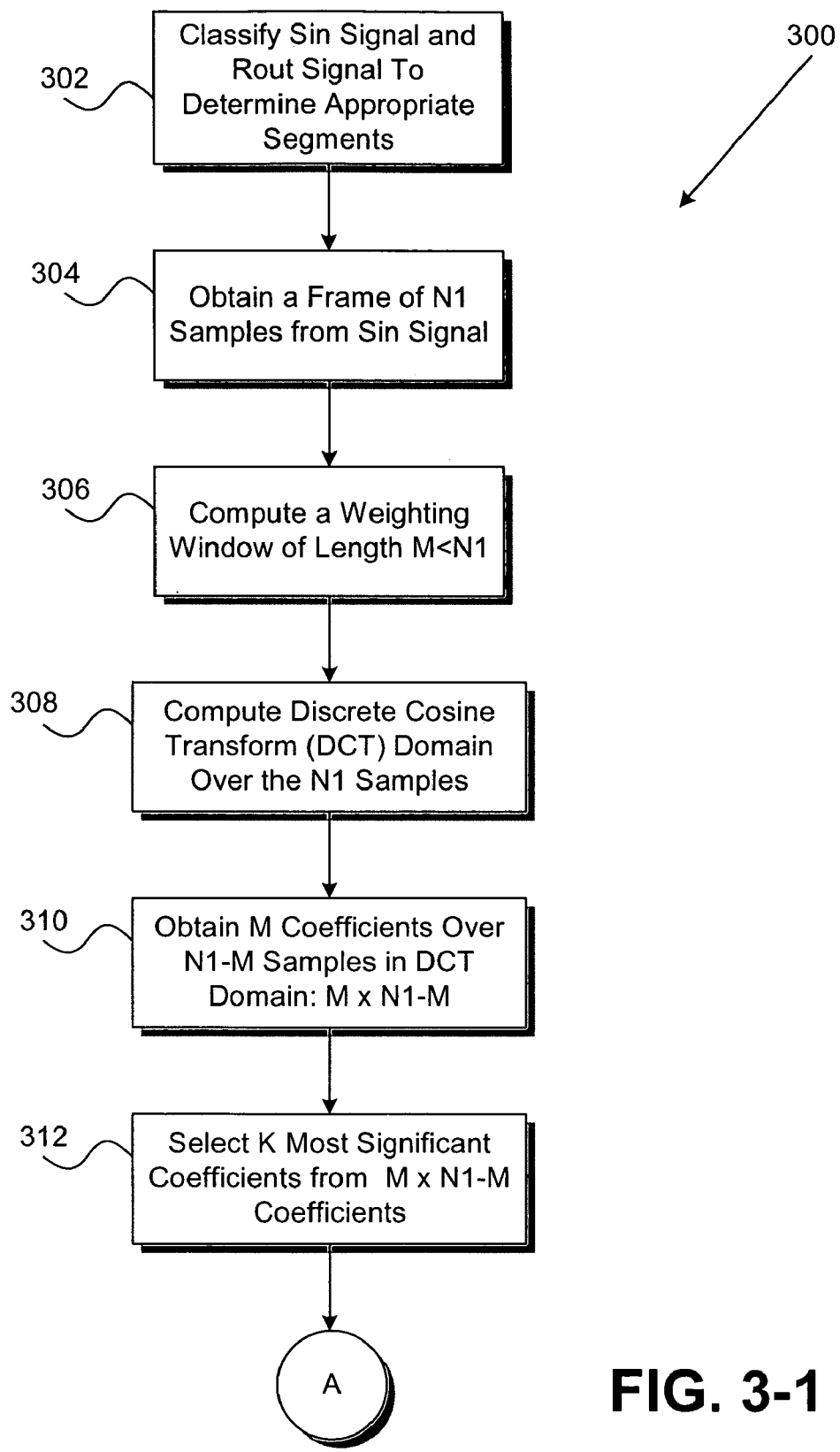
FIG. 3 illustrates a flow diagram for use in conjunction with the echo canceller of FIG. 2 to estimate the bulk delay, and to detect a double talk condition and an echo path change, according to one embodiment of the present invention.
Figures 2, 3:
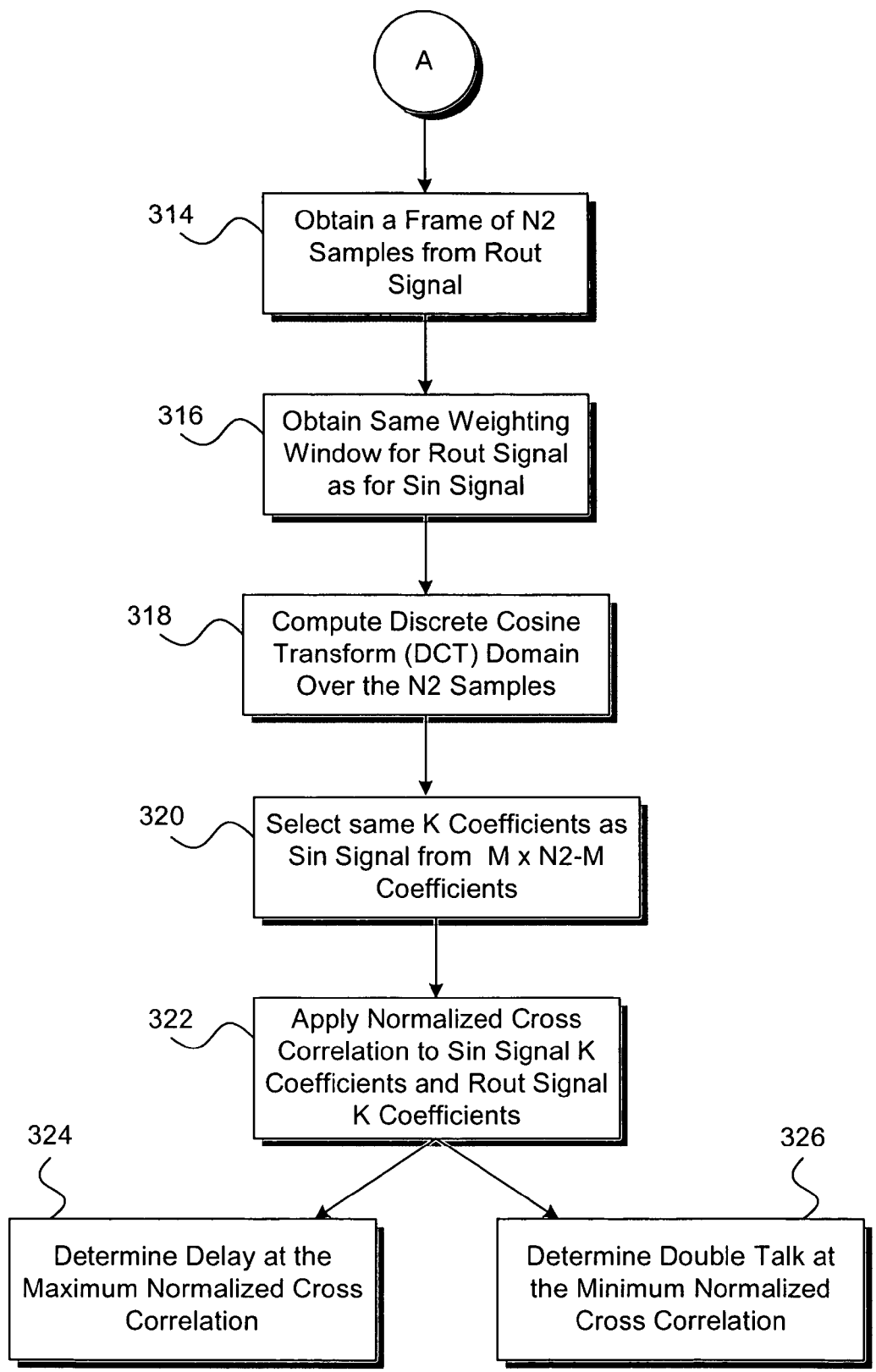

With continued reference to FIG. 2, echo canceller 200 performs bulk delay detection and double talk detection in a transform domain, such as Discrete Cosine Transform Domain (DCT), which includes delineation of DCT-I, DCT-II, M-DCT, etc. The double talk detection and the bulk delay determination of echo canceller 200 are described below in conjunction with FIG. 3. As shown in FIG. 3, discrete cosine transform domain module 210 of echo canceller 200 classifies Sin signal 202 and Rout signal 204 to determine appropriate segments of Sin signal 202 and Rout signal 204 for signal processing. For example, if a segment of Sin signal 202 has a low-level energy, i.e. below a pre-determined threshold, or if a segment of Sin signal 202 signal has a constant energy, that segment of Sin signal 202 is not proper for signal processing, because the signal processing (described below) would not result in the desirable information for estimating the bulk delay or detecting the double talk condition. It should be noted that Sin signal 202 and Rout signal 204 may be classified based on criteria other than energy, such as determining segments that are voiced or unvoiced.

After echo canceller 200 determines that particular segment(s) of Sin signal 202 and Rout signal 204 are appropriate for signal processing, DCT method 300 of FIG. 3 moves to step 304, where discrete cosine transform domain module 210 obtains a frame of N1 samples from Sin signal 202. In one embodiment, N1 may be a multiple of number of samples per frame. Next, at step 306, echo canceller 200 computes a weighting window of length M, where M is less than N1, such as Hamming window, Tukey window, and the like. At step 308, echo canceller 200 performs a Discrete Cosine Transform over the N1 samples, and at step 310, echo canceller 200 obtains M coefficients from N1−M samples in the DCT domain, i.e. M×N1−M coefficients. At step 312, echo canceller 200 selects K most significant coefficients from M×N1−M coefficients of step 310, where M, N1 and K are integer values. In one embodiment, significant coefficients may be coefficients of highest energy, coefficients with major peaks and/or coefficients having more fluctuations.

Next, DCT method 300 of FIG. 3 moves to step 314, where echo canceller 200 obtains a frame of N2 samples from Rout signal 204. In one embodiment, N2 is usually greater than N1 and may be a multiple of number of samples per frame. Next, at step 316, echo canceller 200 applies the weighting window of step 306 to the N2 samples from Rout signal 204. At step 318, echo canceller 200 performs a Discrete Cosine Transform over the N2 samples from Rout signal 204, and at step 320, echo canceller 200 selects same K coefficients as those selected in step 312. Next, at step 322, echo canceller 200 applies normalized cross correlation to the K coefficients from Sin signal 202 and the K coefficients from Rout signal 204. At step 324, the bulk delay is determined at the maximum normalized cross correlation. For example, in one embodiment, the bulk delay is determined when the normalized cross correlation is above 0.9 for line echo or above 0.7 for acoustic echo control. Further, at step 326, the double talk condition is detected when the normalized cross correlation is at a minimum, e.g., when the normalized cross correlation is below 0.4.

In another embodiment of the present invention, echo canceller 200 may also detect an echo path change by tracking the bulk delay changes, where the bulk delay is determined according to DCT method 300. Echo canceller 200 may evaluate changes in the bulk delay and trigger an echo path change detection if the bulk delay changes more than a pre-determined threshold. As a result of the echo path change detection, echo canceller 200 may be reset or initialized to converge according to the new echo path.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An echo cancellation method comprising:
   obtaining a plurality of samples from a first signal;
   computing a Discrete Cosine Transform (DCT) domain over the plurality of samples of the first signal to generate a plurality of DCT samples of the first signal;
   selecting one or more first coefficients from the plurality of DCT samples of the first signal;
   obtaining a plurality of samples from a second signal;
   computing a DCT domain over the plurality of samples of the second signal to generate a plurality of DCT samples of the second signal;
   selecting one or more second coefficients from the plurality of DCT samples of the second signal, wherein the one or more second coefficients are same coefficients as the one or more first coefficients;
   applying normalized cross correlation to values of the one or more first coefficients and values of the one or more second coefficients to generate normalized cross correlation values;
   determining a bulk delay of the echo based on the normalized cross correlation values;
   generating a third signal by subtracting an echo of the second signal from the first signal to cancel the echo using the bulk delay.

2. The echo cancellation method of claim 1, wherein the determining determines the bulk delay at a maximum value of the normalized cross correlation values.

3. The echo cancellation method of claim 2, wherein the determining determines the maximum value to be above 0.9.

4. The echo cancellation method of claim 2, wherein the determining determines the maximum value to be above 0.7.

5. The echo cancellation method of claim 1 further comprising:
   determining a double talk condition based on the normalized cross correlation values.

6. The echo cancellation method of claim 5, wherein the determining determines the double talk condition at a minimum value of the normalized cross correlation values.

7. The echo cancellation method of claim 6, wherein the determining determines the minimum value to be above 0.4.

8. The echo cancellation method of claim 1 further comprising:
   classifying the first signal and the second signal prior to obtaining the plurality of samples.

9. The echo cancellation method of claim 1 further comprising:
   computing a weighting window prior to computing the DCT domain over the plurality of samples of the first signal and the plurality of samples of the second signal.

10. The echo cancellation method of claim 1, wherein the selecting selects one or more first coefficients based on predetermined criteria including highest energy, major peaks and/or more fluctuations.

11. The echo cancellation method of claim 1 further comprising:
    determining an echo path change based on the normalized cross correlation values.

12. An echo cancellation system comprising:
    a Discrete Cosine Transform (DCT) domain module configured to obtain a plurality of samples from a first signal, compute a DCT domain over the plurality of samples of the first signal to generate a plurality of DCT samples of the first signal, and select one or more first coefficients from the plurality of DCT samples of the first signal;
    the DCT domain module is further configured to obtain a plurality of samples from a second signal, compute DCT domain over the plurality of samples of the second signal to generate a plurality of DCT samples of the second signal, and select one or more second coefficients from the plurality of DCT samples of the second signal, wherein the one or more second coefficients are same coefficients as the one or more first coefficients; and
    the DCT domain module is further configured to apply normalized cross correlation to values of the one or more first coefficients and values of the one or more second coefficients to generate normalized cross correlation values; and
    a bulk delay detector configured to determine a bulk delay of the echo based on the normalized cross correlation values;
    wherein the echo cancellation system generates a third signal by subtracting an echo of the second signal from the first signal to cancel the echo using the bulk delay.

13. The echo cancellation system of claim 12, wherein the bulk delay detector determines the bulk delay at a maximum value of the normalized cross correlation values.

14. The echo cancellation system of claim 13, wherein the bulk delay detector determines the maximum value to be above 0.9.

15. The echo cancellation system of claim 13, wherein the bulk delay detector determines the maximum value to be above 0.7.

16. The echo cancellation system of claim 12 further comprising:
    a double talk detector configured to determine a double talk condition based on the normalized cross correlation values.

17. The echo cancellation system of claim 16, wherein the double talk detector determines the double talk condition at a minimum value of the normalized cross correlation values.

18. The echo cancellation system of claim 17, wherein the double talk detector determines the minimum value to be above 0.4.

19. The echo cancellation system of claim 12, wherein the DCT domain module is further configured to classify the first signal and the second signal prior to obtaining the plurality of samples.

20. The echo cancellation system of claim 12 wherein the DCT domain module is further configured to compute a weighting window prior to computing the DCT domain over the plurality of samples of the first signal and the plurality of samples of the second signal.

21. The echo cancellation system of claim 12, wherein the DCT domain module selects one or more first coefficients based on predetermined criteria including highest energy, major peaks and/or more fluctuations.

22. The echo cancellation system of claim 12, wherein the echo cancellation system determines an echo path change based on the normalized cross correlation values.

* * * * *